United States Patent [19]

Amundsen, Jr.

[11] 3,937,542
[45] Feb. 10, 1976

[54] ELECTRICAL BRUSH CONTACT
[76] Inventor: Hyrum J. Amundsen, Jr., P.O. Box 8411, Fountain Valley, Calif. 92708
[22] Filed: Jan. 15, 1975
[21] Appl. No.: 541,287

[52] U.S. Cl.................. 339/3 R; 116/34 R; 340/58
[51] Int. Cl.².......................................... H01R 39/00
[58] Field of Search.......... 339/3 R, 113 L; 116/34; 340/58, 52 R

[56] References Cited
UNITED STATES PATENTS

| | | | |
|---|---|---|---|
| 2,191,205 | 2/1940 | Rogers | 340/58 |
| 2,256,688 | 9/1941 | Pierce | 340/58 |
| 2,593,824 | 4/1952 | Wilson | 340/58 X |
| 3,162,835 | 12/1964 | Dudar | 339/3 R X |

Primary Examiner—Roy Lake
Assistant Examiner—DeWalden W. Jones

[57] ABSTRACT

An electrical brush contact for use in an electrical circuit requiring the conduction of electrical energy between relatively moving objects, said contact having a contactor block mounted on one of said objects and a block engaging brush mounted on the other object, said brush providing a stud disposed adjacent to the path of relative movement of the block, a helical spring mounted on the stud having an anchored end and an opposite end, and a plurality of wire bristles mounted on said opposite end of the spring and substantially tangentially extended therefrom for block engagement.

5 Claims, 4 Drawing Figures

ELECTRICAL BRUSH CONTACT

BACKGROUND OF THE INVENTION

The present invention relates to an electrical brush contact and more particularly to such a contact which has improved resilience, greater durability and improved dependability.

The applicant is the owner of U.S. Pat. No. 3,252,135 on a Pressure Monitoring Apparatus, which discloses a system for the remote indication of tire pressures on automotive vehicles during movement of the vehicles. That apparatus of the patent employs a bellows which is mounted on a wheel and which is capable of expansion and contraction in response to tire pressure changes to activate a signal device visible to a vehicle operator when the tire pressure falls below a predetermined level. An electrical circuit is utilized which includes a stationary brush having one end rigidly mounted on the vehicle and an opposite end which makes intermittent contact with a contactor block 62 mounted on and rotating with a wheel so as to complete the circuit between the rotating wheel and the vehicle.

The contact of the present invention was invented in the solution to certain problems encountered by the Pressure Monitoring Apparatus and is conveniently described in relation thereto although not limited to such illustrative environment. As disclosed in the patent, each wheel rotation caused a closing and an opening of a brush contact. Such actuation results in fatigue and contact failure due to distortion or breakage.

SUMMARY OF THE INVENTION

It is therefore an object of the present invention to provide an improved electrical brush contact adapted reliably to complete and interrupt a circuit from a rotating circuit component to a non-rotating component.

It is another object to provide such a contact which resists deformation and breakage by protracted operation.

A further object is to provide such a contact capable of economical manufacture.

An additional object is to provide a contact which reacts cooperatively with a rotating member to conduct a pulse current.

A still further object is to provide a contact which allows intermittent electrical contact with a rotating member.

These and other objects and advantages will become more fully apparent upon reference to the following description.

DESCRIPTION OF THE PREFERRED EMBODIMENT

Figure 1:
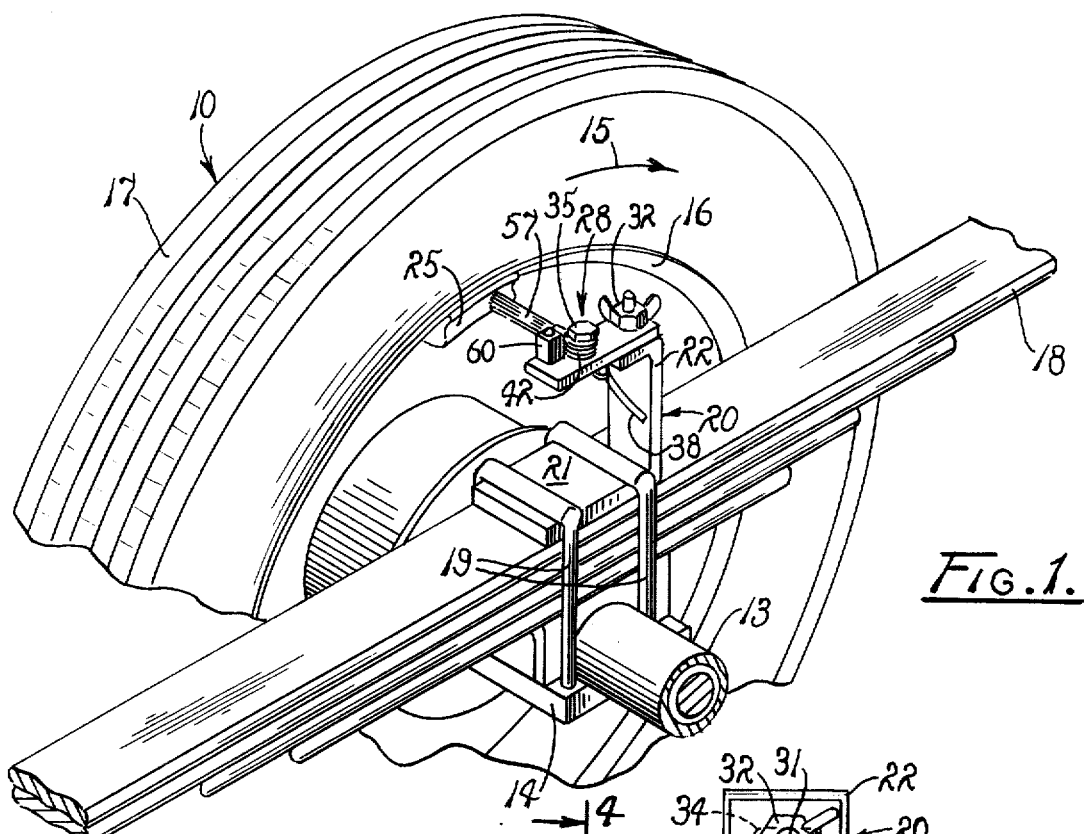
FIG. 1 is a perspective view of an electrical brush contact embodying the principles of the present invention mounted on portions of an automotive vehicle which are fragmentarily represented.

Referring in greater detail to the drawing, an environment for the present invention illustratively includes a wheel 10, shown in FIG. 1, rotatably mounted by an axle 13 having a housing 14. The wheel and axle constitute portions of an automotive vehicle not fully shown. A rotational direction corresponding to the forward movement of the vehicle is shown by the arrow 15. The wheel includes a rim 16 and an inflated pneumatic tire 17 mounted thereon. An elongated leaf spring 18 is disposed above and orthogonal to the axle and is mounted on the axle housing by encircling shackles 19. As a mounting facility for a portion of the present invention to which specific reference will be made, a U-bolt 20 with a crosspiece 21 is secured by nuts 22 around the spring forward of the axle.

As described, the present invention resulted as an improvement to the Pressure Monitoring Apparatus of U.S. Pat. No. 3,252,135 which provides an indication to a vehicle operator when the pressure in his tires has fallen below a predetermined level. The entire monitoring apparatus is not fully described herein but is completely described in the designated patent. It includes means in the form of a tire pressure detector to close a circuit on the wheel 10 when and if the tire pressure falls below a predetermined level, the wheel circuit being electrically connected to circuitry elsewhere on the vehicle by contact means which intermittently connects with the rotating wheel. The present invention relates only to an improvement in that contact means.

Figure 2:
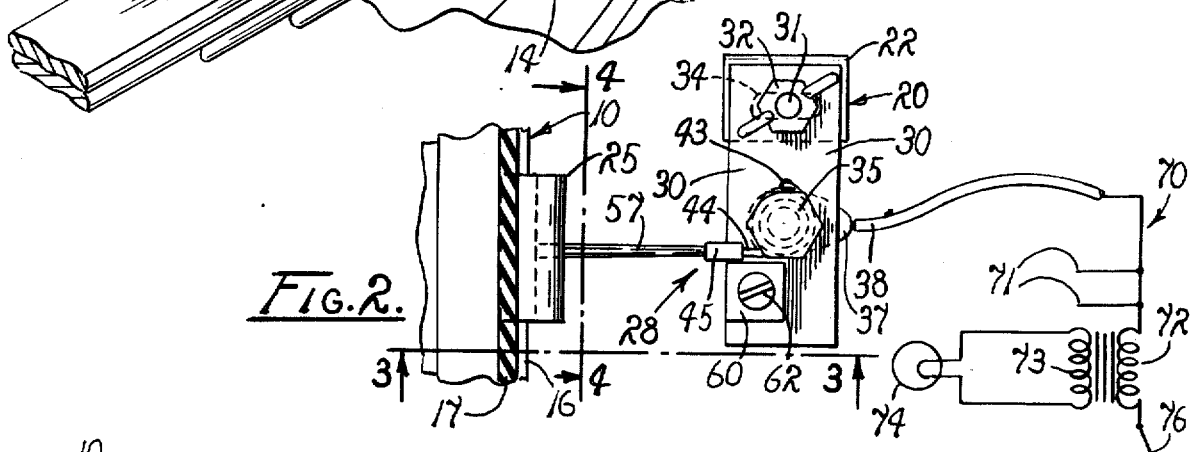
FIG. 2 is an enlarged section taken on line 2—2 of FIG. 1.

A portion of the monitoring apparatus is shown in FIG. 2 mounted on wheel 10 but is not part of the present invention, being included herein for clarity. The tire pressure detector 23, shown in FIG. 2, is mounted on the rim 16 in pneumatic communication with the inflated tire 17. A wire 24 electrically connects the detector 23 with a grooved contactor block 25 disposed on the periphery of the rim 16 adjacent to the axle housing 14 and serves as a contact rotating with wheel 10 which intermittently is connected to a non-rotating contact, next described.

Mounted on the crosspiece 21 is an embodiment of the present invention, an electrical brush contact, shown generally at 28, disposed to serve as the aforementioned non-rotating contact cooperating with the rotating block 25. A flat elongated bracket 30 of insulating material is mounted on the crosspiece 21 parallel with the spring 18 in spaced relation to the rim 16 and secured to the crosspiece by any suitable means, such as a bolt 31 and a nut 32. The crosspiece 21 preferably has an elongated slot 34 therein through which the bolt 31 extends to accommodate adjustment of the bracket toward and from the wheel. An elongated stud or pivot pin 35 is mounted on the top of the bracket 30 extending axially upwardly therefrom and protruding downwardly through the bracket 30. The pin is conveniently secured in position by a nut 36 screw-threadably mounted thereon and tightened upwardly against the bracket 30. A terminal 37 is axially mounted on the pin and secured by nut 36. A conductor wire 38 is connected to the terminal.

A helically coiled spring 42 circumscribes and is mounted on the pin 35. The spring has a lower end 43 anchored to the bracket 30 and a free end 44 extended toward the wheel when the spring is relaxed. A clamp 45 is connected to the free end of the spring. A brush consisting of a plurality of electrically conductive elongated wire bristles 57 of spring steel or the like is secured at one end thereof to the clamp and has an opposite end disposed in the path of travel of the contactor block 25. When the brush engages the block an electrical circuit is completed between the rotating and non-rotating members 10 and 14. The spring 42 serves as a resilient mount for the bristles, allowing flexing in the forward direction as the block 25 meets and passes beyond the bristles 57 in its rotary pattern thereby preventing deformation and damage to the bristles. A stop 60 is mounted atop the bracket 30 and secured by a screw 62 and a nut 64, adjacent to the pin 35 and rearwardly thereof in relation to the direction of wheel rotation. The stop is adapted to limit rearward pivotal movement of the clamp 45 and bristles 57.

Figure 3:
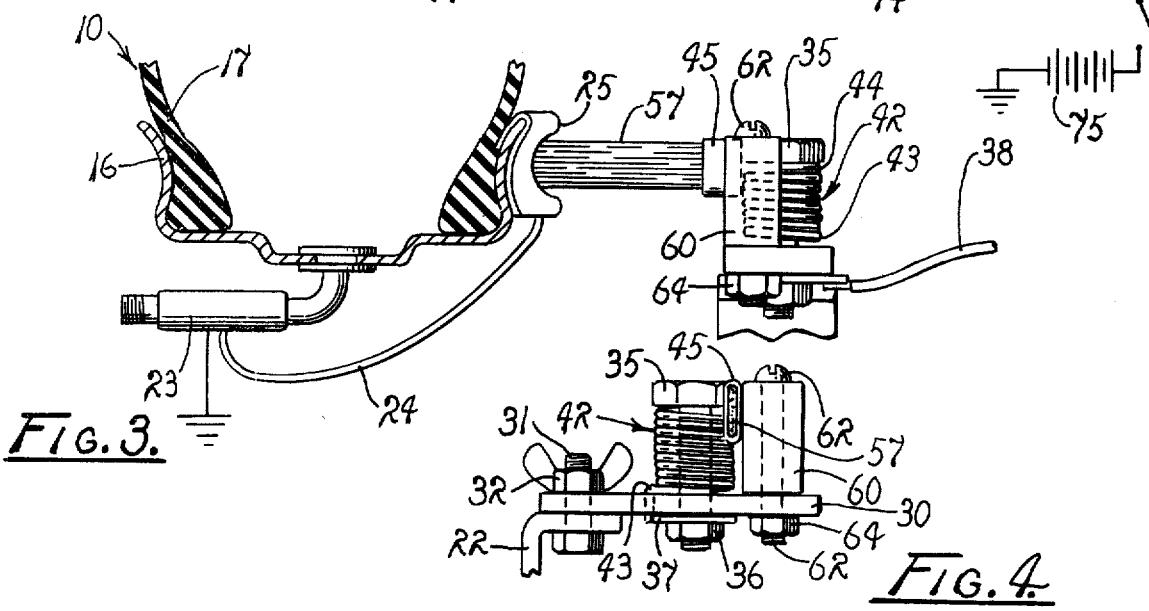
FIG. 3 is an enlarged fragmentary top plan view of the contact shown in FIG. 1 together with an illustrative electrical circuit which is schematically represented.

The wire 38 connects the pivot pin 35, and hence the bristles 57, to a non-revolving electrical circuit 70, shown schematically in FIG. 3. The circuit includes terminals 71 representing possible connections to devices on other wheels of the automotive vehicle which would be connected in parallel with the electrical system shown for wheel 10. All such interconnections are fed into one side of a transformer primary 72 having a corresponding secondary 73 which is connected to a neon bulb 74 located within view of the vehicle operator and adapted for excitation by passage of a fluctuating current through the transformer primary inducing a voltage therein which is increased in the secondary to a level adequate to excite the bulb. A voltage source 75 is connected through a switch 76 to the other side of the transformer primary 72 providing a current path through the primary 72. When the block 25 is in contact with the bristles 57 and switch 76 is closed there is a completed circuit from one side of the circuit, disposed on the wheel 10 to the voltage source 75 through the brush contact 28 of the instant invention. Current flow through primary 72 and the resultant excitation of bulb 74 ensue when and if the circuit on the wheel 10 is connected to ground, as will later be discussed.

OPERATION

The operation of the described embodiment of the present invention is believed to be clearly apparent and is summarized briefly at this point. The bracket 30 is first positioned in proper spaced relation to the rim 16 to provide periodic contact between block 25 and bristles 57 as the wheel 10 is rotated. The wire 38 extending from pin 35 below bracket 30 is connected to the circuit 70. The Pressure Monitoring Apparatus is adjusted to close the wheel circuit to ground at a desired pressure. The operator determines that the switch 76 is closed, thus providing electrical continuity between the grounded side of the voltage source 75 and the bristles 57. As the vehicle is moving the bristles intermittently contact block 25 providing intermittent continuity to the wheel circuit which is open until the tire pressure has dropped below the desired level.

In the event that tire pressure falls below the desired level, the detector 22 on the wheel 10 closes. Since the bristles 57 provide intermittent contact to the block 25, a completed circuit exists with every revolution of the wheel with a duration corresponding to the time for which contact is maintained between the bristles and the block. The intermittent continuity allows a transient current to flow through primary 72 inducing a voltage therein. The primary voltage is stepped up in the secondary 73 to a level adequate to excite bulb 74, which lights during the period of the transient current. Thus the neon bulb 74 is caused to flicker on and off with each wheel rotation as the bristles 57 contact rotating block 25 thus creating a highly visible signal for the operator. When the operator observes the flashing bulb he is alerted to take proper action as by stopping the vehicle and inspecting or replacing the tire.

The contact of the block 25 with the bristles 57 causes the bristles to flex in the direction of the rotation of wheel 10 and also to tighten spring 52. When the block 25 has rotated beyond the area of contact with the bristles the latter snap back into the ready position shown in FIG. 1. As best seen in FIG. 2, the block is concave to gather or bunch the bristles when engaged therewith. As indicated in FIG. 1, the concavity is arcuately elongated concentrically of the wheel. The stop 60 serves to limit the rearward travel of the clamp 55 and bristles 57. The resiliency inherent in the bristles and spring along with the action of the stop and the disposition of the bristles enable the bristles to maintain their original shape for a prolonged period and represents an improved method of making electrical contact with a rotating body. In actual operation, the contact has proved much more dependable and durable than those previously known for the purpose.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. A brush contact comprising a pin, a helical spring mounted in circumscribing relation on the pin and having opposite ends, means mounting one end of the spring in fixed relation to the pin, and brush means mounted on the opposite end of the spring and extended transversely from the pin substantially tangentially of the helical spring.

2. In a system having an electrical circuit for use on a vehicle having a wheel rotatably mounted thereon with a portion of the circuit and a contactor mounted on the wheel, and the remainder of the circuit mounted non-rotatably on the vehicle, a brush contact adapted to make intermittent contact with the contactor as the wheel rotates so as to connect rotating and non-rotating components of the circuit comprising a pin mounted on the vehicle adjacent to the wheel, a helical spring mounted in circumscribing relation on the pin having one end anchored on the vehicle and an opposite free end, and a brush of bristles mounted on the free end of the spring and extended substantially tangentially of the spring into the path of travel of the contactor during wheel rotation.

3. The system of claim 2 in which the contactor is elongated concentrically of the wheel and is transversely concave to bunch the bristles engaged therewith.

4. In the system of claim 2, the convolutions of the spring being in such direction that engagement of the bristles with the contactor tends to tighten the spring, and a stop mounted adjacent to the pin engageable with the free end of the spring to limit movement of the bristles in the direction tending to open the spring.

5. In a tire pressure sensing apparatus for use on a vehicle having a wheel rotatably mounted on the vehicle with a contactor mounted on said wheel wherein the sensing device includes an electrical circuit having some components on the rotating wheel and non-rotating components elsewhere on the vehicle; an electrical brush contact adapted to make intermittent contact with the contactor including a plurality of elongated electrically conductive wire bristles disposed in substantially normal relation to the plane of the wheel; a clamp securing together a common end of the bristles; a mounting bracket mounted on said vehicle in spaced relationship to said wheel; a pin disposed on said mounting bracket in substantially parallel relation to the plane of the wheel; a spring circumscribing the pin with one end connected to and supporting the clamp and the other end connected to the non-rotating components disposed to enable the wire bristles to engage the contactor when opposite thereto; and a stop borne by the mounting bracket whereby the contactor makes periodic contact with the bristles as the wheel rotates, the spring allowing the bristles to be pivoted in the direction of the contactor motion and the stop serving to limit spring motion in the opposite direction.

* * * * *

UNITED STATES PATENT AND TRADEMARK OFFICE
CERTIFICATE OF CORRECTION

PATENT NO. : 3,937,542

DATED : February 10, 1976

INVENTOR(S) : Hyrum J. Amundsen, Jr.

It is certified that error appears in the above—identified patent and that said Letters Patent are hereby corrected as shown below:

Column 1, Line 61, delete:

"Fig. 2 is an enlarged section taken on line 2-2 of Fig. 1.

Fig. 3 is an enlarged fragmentary top plan view of the contact shown in Fig. 1 together with an illustrative electrical circuit which is schematically represented.

Figure 4:
FIG. 4 is a side elevation of a mounting plate of the invention of FIG. 1.

Fig. 4 is a side elevation of a mounting plate of the invention of Fig. 1."

And Insert:

--- Fig. 2 is an enlarged fragmentary top plan view of the contact shown in Fig. 1 together with an illustrative electrical circuit which is schematically represented.

Fig. 3 is an enlarged section taken from a position indicated by line 3-3 of Fig. 2.

Fig. 4 is a fragmentary front elevation taken on line 4-4 in Fig. 2. ---.

UNITED STATES PATENT AND TRADEMARK OFFICE
CERTIFICATE OF CORRECTION

PATENT NO. : 3,937,542
DATED : February 10, 1976
INVENTOR(S) : Hyrum J. Amundsen, Jr.

It is certified that error appears in the above-identified patent and that said Letters Patent are hereby corrected as shown below:

Column 2, Line 15, delete, "As a mounting facility for a portion of the present invention to which specific reference will be made, a U-bolt 20 with a crosspiece 21 is secured by nuts 22 around the spring forward of the axle.".

And insert,---A U-shaped mounting bracket 20, having a base portion 21 and an upwardly extending L-shaped mounting portion, is secured on the leaf spring by loosening the shackles 19, inserting the base portion thereunder and again tightening the shackles to mount the bracket in the erect attitude shown in Fig. 1.

UNITED STATES PATENT AND TRADEMARK OFFICE
CERTIFICATE OF CORRECTION

PATENT NO. : 3,937,542
DATED : February 10, 1976
INVENTOR(S) : Hyrum J. Amundsen, Jr.

Page 3 of 4

It is certified that error appears in the above-identified patent and that said Letters Patent are hereby corrected as shown below:

The bracket serves as a mounting facility for a portion of the device of the present invention. ---

Column 2, Line 34, delete "Fig. 2" and insert --- Fig. 3 ---.

Column 2, Line 36, delete "Fig. 2" and insert --- Fig. 3 ---.

Column 2, Line 44, delete "crosspiece 21" and insert --- mounting portion 22 of the bracket 20 ---.

Column 2, Line 49, delete "crosspiece" and insert --- mounting portion 22 ---.

Column 2, Line 51, delete "crosspiece" and insert --- mounting portion ---.

Column 2, Line 52, delete "crosspiece 21" and insert --- mounting portion 22 ---.

UNITED STATES PATENT AND TRADEMARK OFFICE
CERTIFICATE OF CORRECTION

PATENT NO. : 3,937,542
DATED : February 10, 1976
INVENTOR(S) : Hyrum J. Amundsen, Jr.

It is certified that error appears in the above–identified patent and that said Letters Patent are hereby corrected as shown below:

Column 2, Line 55, after "and from the wheel." And insert --- As shown in Fig. 1, the bracket 30 is mounted on the bracket 20 so as to extend above and parallel to the base portion 21 over the axle 13. ---.

Signed and Sealed this

Thirteenth Day of July 1976

[SEAL]

Attest:

RUTH C. MASON
*Attesting Officer*

C. MARSHALL DANN
*Commissioner of Patents and Trademarks*